US005374031A

United States Patent [19]

Semence et al.

[11] Patent Number: 5,374,031

[45] Date of Patent: Dec. 20, 1994

[54] BUTTERFLY-VALVE ASSEMBLY HAVING AN ADMISSION PASSAGE OF PROGRESSIVELY-CHANGING SHAPE, AND METHOD OF MANUFACTURING SAME

[75] Inventors: Pierre Semence, Chatou; Michael Pontoppidan, Rueil Malmaison, both of France

[73] Assignee: Solex, France

[21] Appl. No.: 219,414

[22] Filed: Mar. 22, 1994

Related U.S. Application Data

[63] Continuation of Ser. No. 108,303, Aug. 19, 1993, abandoned.

[30] Foreign Application Priority Data

Aug. 21, 1992 [FR] France ................................ 92 10198

[51] Int. Cl.[5] .................................................. F16K 1/22

[52] U.S. Cl. ...................................... 251/305; 123/337

[58] Field of Search .......................... 251/305; 123/337

[56] References Cited

U.S. PATENT DOCUMENTS 4,905,647 3/1990 Kizer et al. ..................... 251/305 X

FOREIGN PATENT DOCUMENTS 0109792 5/1984 European Pat. Off. .
0433518 6/1991 European Pat. Off. .
2663710 12/1991 France .

OTHER PUBLICATIONS

MTZ Motortechnische Zeitschrift vol. 52, No. 3, 1 Mars 1991, Stuttgart, DE pp. 106–110, XP207774. Friese 'der neue 2,0–1–digifant einspritzmotor im vw passat' p. 108, colonne 2, ligne 23—ligne 51; figures 4,5.

*Primary Examiner*—John C. Fox
*Attorney, Agent, or Firm*—Larson and Taylor

[57] ABSTRACT

The butterfly valve assembly comprises a body formed with an admission duct and a disk shaped butterfly valve member of predetermined shape carried by a shaft that extends transversally to the passage and mounted for rotation in the body between a minimum opening position of the valve member and a maximum opening position. The duct has a cylindrical length whose cross-section matches with the shape of the butterfly valve member when the latter is in its minimum opening position. It further has respective zones upstream and downstream from the cylindrical length, along the paths followed by upstream and downstream edges of the valve member up to a determined opening angle thereof. Such zones are further defined by successive circular arcs centered on the axis of the admission duct and having radii that decrease going away from the cylindrical length along the axis.

7 Claims, 2 Drawing Sheets

BUTTERFLY-VALVE ASSEMBLY HAVING AN ADMISSION PASSAGE OF PROGRESSIVELY-CHANGING SHAPE, AND METHOD OF MANUFACTURING SAME

This application is a continuation of application Ser. No. 08/108,303 filed Aug. 19, 1993 now abandoned.

BACKGROUND OF THE INVENTION

The present invention relates to a butterfly valve assembly for a fuel injection apparatus of an internal combustion engine, in particular for an injection apparatus that includes electronic means for controlling the quantity of fuel injected during each operating cycle of the engine.

The quantity of fuel injected per cycle must be proportional to the flow rate of air admitted to the engine. In many injection devices used at present, the air flow rate is computed by electronic means on the basis of signals that indicate firstly the extent to which the butterfly valve member is open (e.g. as provided by a potentiometer), and secondly the pressure differential between the upstream side and the downstream side of the valve, which difference is representative of the air speed. Satisfactory control of the engine at low loads (i.e. when the degree of butterfly valve opening is small) requires that any initial increase in flow rate take place very smoothly. In particular, when using an electronically controlled injector, drivability can be obtained in practice only when the initial change in air flow rate as a function of the opening angle a of the butterfly valve has a shape of the kind shown diagrammatically by the heavy line in FIG. 1.

To obtain the required smoothness, a butterfly valve assembly has already been proposed of the type that includes a body formed with an admission duct or passage and a butterfly valve member in the form of a disk that is circular or slightly elliptical, the disk being mounted on a middle rotation shaft that extends transversely to the passage with the valve member being displacable between a position of minimum opening (possibly zero opening) and a position of maximum opening in which the butterfly valve member lies substantially parallel to the axis of the duct, the duct having a wall that is complex in shape such that at the beginning of opening, the cross-sectional air flow area varies as a function of the opening angle of the butterfly valve member much less quickly than would be the case in a cylindrical duct.

If the body is made of metal, where molding does not give any good degree of finish, the complex shapes used heretofore cannot be achieved by simple machining and/or require blanks that are difficult to cast. Furthermore, many shapes do not make it possible to assemble the butterfly valve member merely by inserting it along the axis of the duct, while it is a condition which is essential on an automatic assembly line.

Proposals have nevertheless been made (French patent application FR 90 07848) for a butterfly valve body having a duct of complex shape that can be achieved directly by casting, but only if made of a synthetic material where casting gives sufficient accuracy. However, the shape proposed in application No. 90 07848 is based on an approach that takes into consideration cross-sections rather than flow rates, and as a result it does not make it easy to satisfy all of the relationships between degree of opening and flow rate that are required by present-day manufacturers, which relationships differ considerably depending on the engine being fed or the construction of the driving linkage.

SUMMARY OF THE INVENTION

It is an object of the invention to provide a valve body that satisfies practical requirements better than previously known, in particular in that it makes it possible to obtain any required smoothness without thereby giving rise to difficulties in manufacture or assembly of the butterfly valve or giving rise to jamming.

To this end, there is provided a butterfly valve assembly of the above-defined type wherein the duct has a cylindrical length whose cross-section corresponds to the shape of the butterfly valve member when the latter is in its minimum opening position. The device also has respective zones which extend upstream and downstream from said minimum opening position, that is upstream and downstream from the cylindrical length and along the paths followed by upstream and downstream edges of the butterfly valve up to a determined opening angle thereof. These zones are defined by circular arcs centered on the axis of the admission duct and have radii perpendicular to the axis that decrease going away from the cylindrical length.

As a general rule, the cylindrical length along the axis will be circular in cross-section, which corresponds well to the usual shapes of the butterfly valve member that have an outline that is either circular, or slightly elliptical when the minimum opening position (optionally zero-opening position) of the butterfly valve member is slanted relative to a plane perpendicular to the axis of the duct.

In practice, the axial extent of the cylindrical length is selected so that, for constant sonic pressure difference between upstream and downstream, the sonic flow rate that passes through when the edge of the butterfly valve member projects beyond the cylindrical length (both upstream and downstream) lies in the range 160% to 180% of the sonic flow rate that corresponds to the minimum degree of opening of the valve member. The flow rate corresponding to the minimum degree of opening may be that which passes via the clearance that remains between the edge of the valve member and the admission duct when the closure of the valve member is limited by an abutment so that the valve member cannot bear against the wall, or it may be the flow rate that passes through a by-pass duct that serves, in particular, to deliver air while the engine is idling.

The invention also provides a method enabling a butterfly valve body of the above-defined type to be made relatively simply out of metal. The invention includes the steps of molding a blank having an inside passage presenting respective zones upstream and downstream of a circular cylindrical length which corresponds to a minimum opening position of the butterfly valve member. Each zone has a cross-section with a rotational symmetry so that one of the sides of the midplane of the duct is not followed by the respective edge of the valve member when the latter moves from the minimum opening position. On the opposite side of each zone, the distance perpendicular to the axis of the duct in a cross-section decreases from the plane perpendicular to the axis and containing the shaft axis of the butterfly valve member fill-closed valve member position) towards a plane orthogonal thereto and containing the axis of the butterfly valve member (full opened valve member position). A final step consists in machining the above-defined opposite zones in the form of successive circular arcs having radii extending perpendicularly from the axis that decrease from said cylindrical length according to the position along the axis to the extreme position taken up by the valve member for the predetermined maximum opening position.

The invention will be better understood on reading the following description of a particular embodiment given by way of non-limiting example. The description refers to the accompanying drawings.

DETAILED DESCRIPTION

Figure 1:
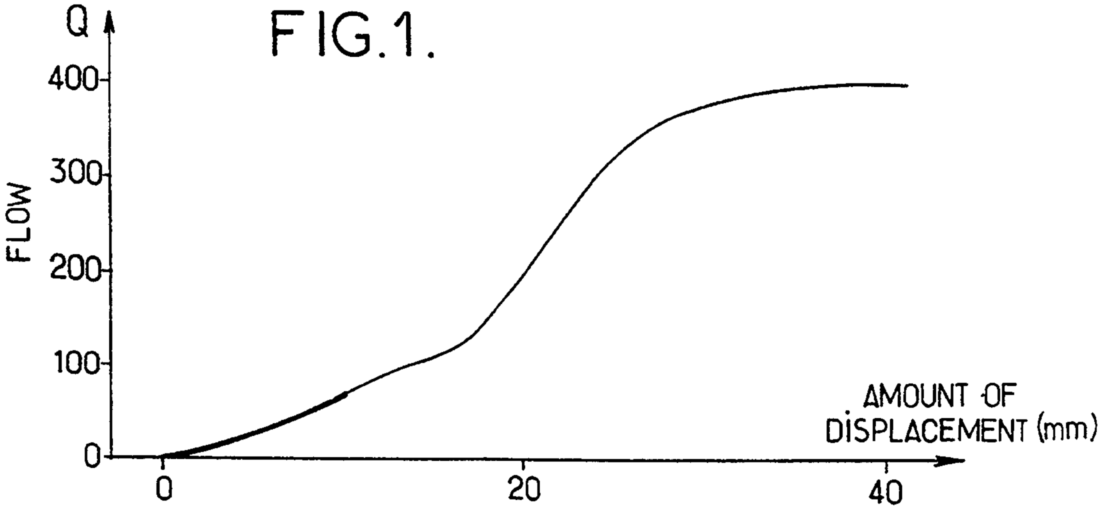
FIG. 1, as mentioned above, shows a desirable relationship for variation of air flow rate Q responsive to the degree of pull on a butterfly valve control cable.
Figure 2:
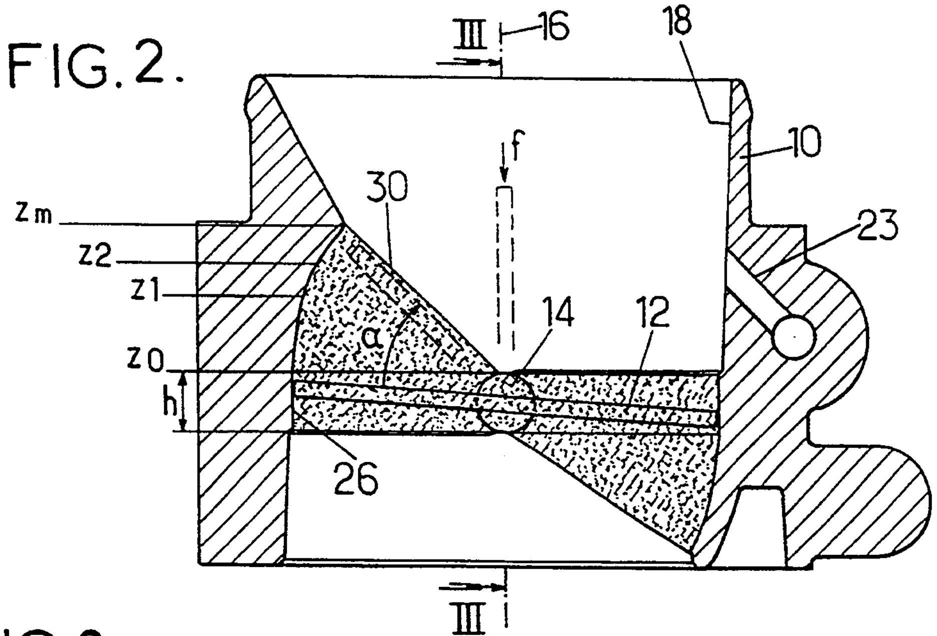
FIG. 2 shows a butterfly valve assembly according to a particular embodiment of the invention, the body being shown in cross-section on a plane that includes the axis of the admission duct and that is orthogonal to the axis of the butterfly valve.
Figure 3:
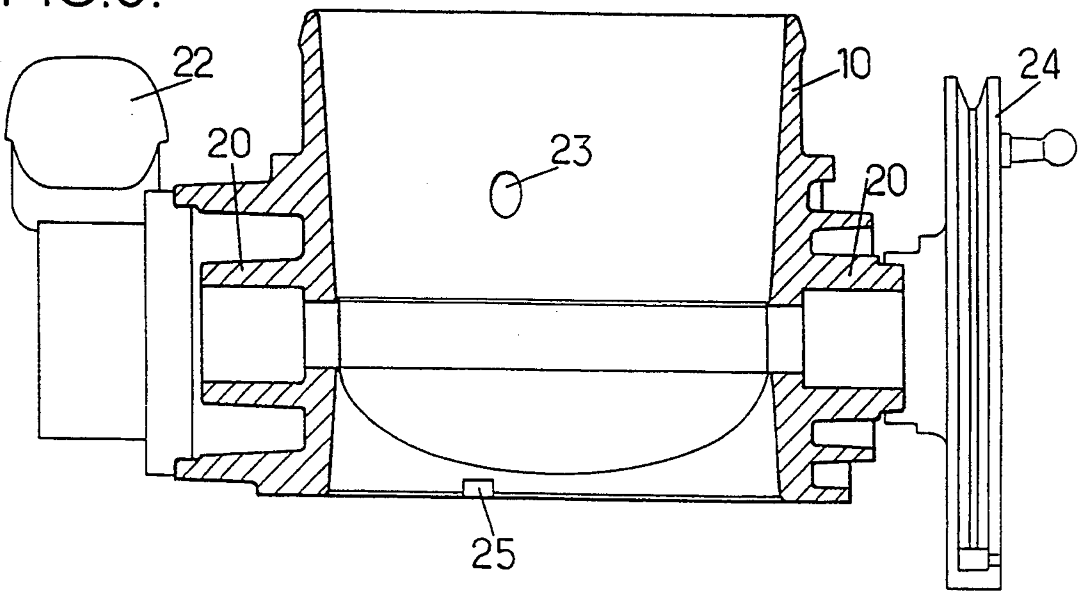
FIG. 3 is a cross-sectional view on line III—III of FIG. 2.
Figure 4:
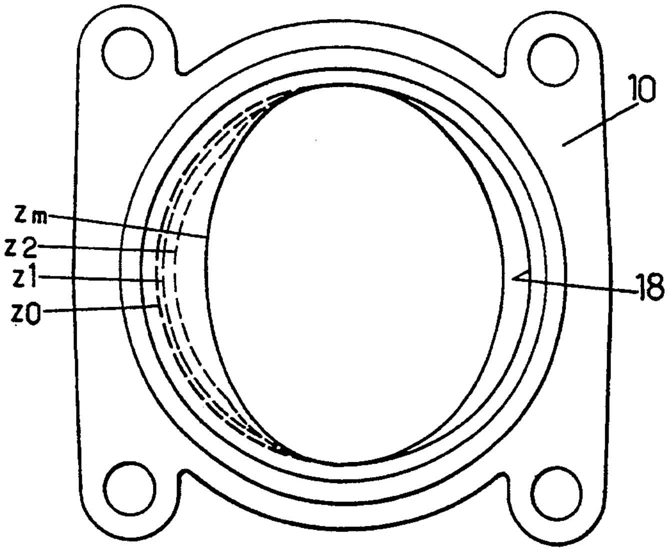
FIG. 4 is a view from above of the valve body of FIG. 1, with the right cross section as levels Z0, Z1 and Z2 of FIG. 2 being shown in dashed lines.

The valve assembly described below is designed to provide a flow rate variation relationship of the kind shown in FIG. 1. As shown in FIGS. 2 to 4, the assembly comprises a metal housing or body 10 made by molding and partial machining and a butterfly valve member 12 (FIG. 2) which is fixed to a shaft 14 enabling it to rotate about a shaft axis that is orthogonal to the axis 16 of an admission duct 18 formed in the housing.

Conventionally, the butterfly valve member 12 shown in FIG. 2 is displaceable between a minimum opening position shown in solid lines and a fully opened position where it lies on the axis 16 of the duct 18. The minimum opening position may be fixed by abutment of the edge of the butterfly valve member which is slightly elliptical (in cross-section relative to the axis 16) in shape against the wall of the duct at a location where said wall is cylindrical, at an inclination of about 5° relative to the plane that extends transversely to the axis 16. The minimum opening position may also be fixed by an adjustable abutment (not shown). Under such circumstances, the minimum opening angle may be 0° or very close to 0°.

In the embodiment shown in FIG. 3, the shaft 14 rotates in bearings formed in bosses 20 of the body. One of the ends of the shaft is secured to the arm of an angle pick-up such as a potentiometer 22 that indicates the angular position of the valve member. The other end is fixed by a cam 24 to which the butterfly valve control cable is attached. A by-pass passage 23 may be formed in the body for connecting the upstream side of the valve member to an outlet 25 situated downstream therefrom. An electrically controlled valve (not shown) is located on this passage enabling it to be opened so as to pass a flow rate of air that is additional to that which passes around the valve member 12, at least when the valve member is in its minimum opening position.

The admission duct 18 may be considered as including a straight cylindrical central length 26 of circular cross-section, of length h, a downstream portion and an upstream portion (above the valve member 12 for an inverted butterfly valve body where air flows in the direction indicated by arrow f).

The diameter of the central portion 26 is such that leaks along the edge of the valve member 12 when it bears against the wall are very small. The height h of said length is selected in such a manner that the flow rate that passes around the valve member, both around the portions located upstream and downstream once its edge projects beyond the cylindrical length, lies in the range 160% to 180% of the sonic flow rate of the minimum degree of opening of the valve member while the optional by-pass passage 22 is closed. In an embodiment that is advantageous because it enables manufacturing tolerances to be minimized, the length 26 is symmetrical about the axis of the shaft 14 of the valve member.

The upstream portion of the admission duct 18 is asymmetrical about the plane including the axis 16 and the axis of shaft 14. That half of the upstream portion which becomes farther from the edge of the valve member during initial opening (right hand half in FIG. 2) is slightly conical or cylindrical and is semi-circular in cross-section perpendicular to the axis 16 at each level along the axis 16. In contrast, the other half at each level z along the axis 16, i.e. between the top level z0 of the cylindrical length 26 and a level zm, has a cross-section perpendicular to the axis 16 that is composite in shape. The cross-section may be considered as having a central portion constituted by an arc of a circle radially centered on the axis 16 (i.e., with a radius or an extension of a radius passing through axis 16) with the radius of the various cross-sections along the axis 16 then decreasing from level z0, and lateral portions that are generally in the form of arcs of ellipses. The longer axis of each ellipse is equal, at each level along the axis 16, to the radius of the cross-section at the same level along the axis 16 of the right hand (other) half of the upstream portion. The smaller or short axis of each ellipse then increases from the central length of the value member. The short axis of this ellipses are selected so that the edge of the valve member moves entirely along the zones where the cross-section is in the form of a circular arc until the valve member reaches level zm, when the circular and elliptical arcs end.

Figure 5:
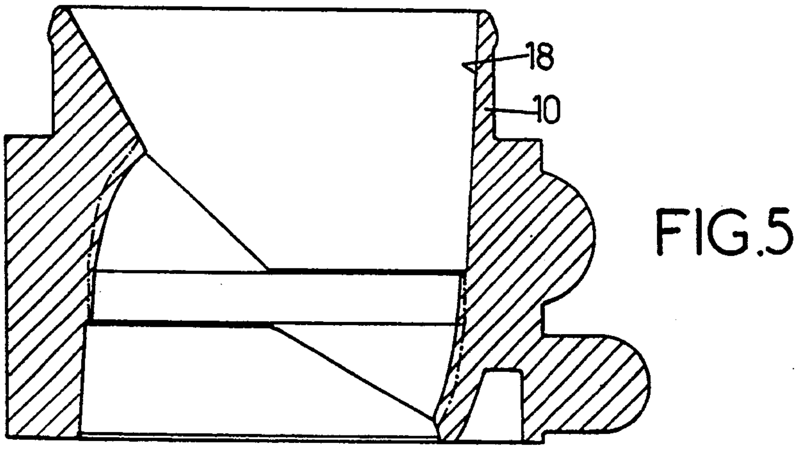
FIG. 5 shows a blank obtained by molding and suitable for constituting the housing of a valve body as shown in FIG. 2, with its shape after machining being shown by chain-dotted lines.

It can be seen in FIG. 2 that this construction leads to selecting an ellipse having such an eccentricity at each level along the axis 16 in the range z0 to zm that the points of intersections between the arcs at each level of the ellipse and the circular arcs lie on a line 30 running from the valve shaft and whose projection on the plane of FIG. 2 or 5 is substantially rectilinear.

The perimeter of the central portion of the lefthand half may as well be considered, at each level along the axis 16 lying in the range z0 and zm, as being the intersection of an elementary or virtual cylinder centered on the axis 16 and of a circular plane connecting the axis shaft of the valve member shaft and the extreme point of the progressively-changing shape constituted in this way to the level zm (the circular plane, or the circular valve member when viewed from above takes on a progressively more elliptical shape as it moves from the closed to the opened position).

Because of its disposition, the valve member can be installed easily, even when it is of considerable thickness. An insertion path is available along the plane that includes the shaft axis 16 and the axis of the valve member shaft 14, in which plane the transverse dimension of the duct (parallel to the shaft 14) is not less than the diameter of the valve member.

The above-defined shapes may be adjusted slightly when the thickness of the valve member is not negligible. In particular, the line 33 then becomes the locus of intersections between successive virtual cylinders and a plane passing through an axis that is offset from the axis of rotation of the valve member towards the axis 16, with the offset being substantially equal to the half-thickness of the valve member.

The downstream portion of the admission duct has the same construction as the upstream portion. It may be symmetrical to the upstream portion. In the example shown in FIG. 2, it is considerably shorter than the upstream portion, in order to obtain a body that is compact.

Figure 4A:
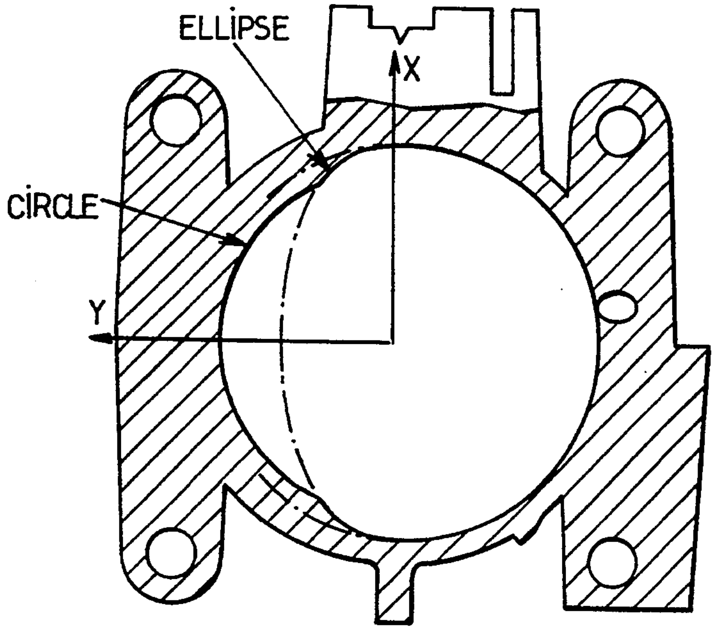
FIG. 4*a* is a cross-section at an intermediary level.

FIG. 2 shows that only the shaded (circular) portions have an effect in determining the relationship between the flow rate and the opening angle of the valve member, until the valve member angle reaches value α. Consequently, these circular portions are the only portions of the duct that need to be machined, and the other portions can remain in the form of raw castings. The machining is relatively simple since it is restricted to cutting successive circular arcs, such as those referenced z1 and z2 in FIG. 4, corresponding to levels z1 and z2 in FIG. 2. As shown in FIG. 4*a*, one half (right hand half) of the cross-section is half-circular in each portion. The central zone of the other half is in the form of a circular arc, as best shown in FIG. 4*a*. That arc is connected to the half circle of the right hand half by portions of an ellipse (at point along the line 30) which merge with the circle.

It is possible to use machined shapes that are symmetrical upstream and downstream from the valve member. However, it is often advantageous to use shapes that are different, thereby providing additional flexibility in matching the various relationships required for variation in flow rate as a function of opening angle.

The radii of the successive circles along the axis 16, i.e. the way in which the shape changes for successive opening angles, can be generated by computer in a manner that is known per se, using software that transforms data relating to variation in air mass flow rate as a function of valve member opening angle into an upstream shape and a downstream shape defined by distinct sets of coordinates. The software is designed to ensure continuity with portions having a right cross-section that is circular or elliptical.

There is no need to describe herein software capable of computing the radius to be given to each level z1, z2, . . ., zm, since such software is within the competence of the person skilled in the art. It is set up taking account of the eccentricity that is selected a priori for the ellipses whose arcs are conserved in the machined body.

The body may be made of metal (e.g. aluminum) and it may be made by injection molding a blank of the kind shown in FIG. 5, and then by machining. The blank shown in FIG. 5 is easily made using a 2-piece core when the two pieces are inserted from the opposite ends along the axis. At each level of the body shown in FIG. 5, the shorter axis of the ellipse is such that the edge of the butterfly valve member will follow the wall elliptically arced of the duct closely but with increasing clearance. The excess thickness to be removed in the machined zones (represented by shaded surfaces in FIG. 2) to form the circular arcs is shown by means of chain-dotted lines in FIG. 5. Since the software gives the radii of successive circular arcs from z0 to zm at a pitch that may be very small (about one tenth of a millimeter), machining can be performed very simply, by changing the machining radius each time a tool passes from one level to the next along the axis 16. Since the step is very small, the final surface is stepped in a manner that can be taken as constituting a continuous surface. In the cylindrical central zone, the entire peripherical surface is machined.

In practice, the opening angle α (FIG. 2) over which the valve member remains in a machined zone will lie in range 35° to 50°.

As a result the valve member can be installed in conventional manner. The shaft of the valve member may be inserted with its slot pointing in the direction that corresponds to the valve member being fully open. The valve 12 is then slid along the axis 16. The shaft is then rotated so as to bring the valve member into its minimum opening position. Fixing means such as screws are then installed.

In the embodiment described above, the valve member has dimensions that prevent it from taking up a position in which it is perpendicular to the axis 16: its abutment position against the wall of the admission duct 18 is at an angle of a few degrees with the plane orthogonal to the axis 16.

The invention may also be used when the valve member can rotate through 180° about its axis, and this solution is sometimes used in a butterfly valve body where the valve member is not under the direct control of the driver but is controlled by a motor to take several operating parameters into account, and in particular the position of the accelerator pedal. Then the length 26 may be limited to a circular line.

In a modified embodiment, the valve member 12 has a folded shape. On one side of the shaft 14, it is in contact with the wall of the duct and is at an angle of some degrees with an orthogonal plane when in its minimum opening position. On the other side, it is orthogonal to the axis when in its minimum opening position. Then the length 26 will be dissymetrical and each edge will be at a respective end of the cylindrical length when in the minimum opening position.

Since plastics materials can be molded with much greater accuracy than metals, a body of the kind described above may advantageously be made of plastics material by direct molding on a core. Under such circumstances, it is the outside shape of the core that needs to be machined in order to obtain the above-defined shape.

We claim:

1. Butterfly valve assembly for a fuel injection apparatus of an internal combustion engine, comprising:

a body formed with an admission duct having an axis and a cross-section variable along said axis, for circulation of air in a predetermined direction; and a disk shaped butterfly valve member of predetermined shape carried by a shaft that extends transversely to the duct, said valve member being mounted by said shaft for rotation in said body between a minimum opening position of said valve member and a maximum opening position in which said valve member lies substantially parallel to the axis of the duct;

said duct having:

a cylindrical length along the axis whose cross-section perpendicular to the axis matches with the shape of said butterfly valve member when said valve member is in said minimum opening position, said cylindrical length extending upstream and downstream from said minimum opening position along said axis, an upstream zone having a surface merging with said cylindrical length, a surface part of said surface of said upstream zone following adjacent but with increasing separation a path taken by an edge of said valve member during opening thereof from the minimum opening position up to a predetermined degree of opening, and a downstream zone having a surface merging with said cylindrical length, a surface part of said surface of said downstream zone following adjacent but with increasing separation a path taken by another edge of said valve member during opening thereof from the minimum opening position up to the predetermined degree of opening, said surface parts of said downstream zone and of said upstream zone which follow a respective one of said edges of said valve member each having, at each progressive level from said cylindrical length along said axis, a cross-section transverse to said axis defined by:

a central circular arc of a circle radially centered about said axis and centered in said surface part, each said circular arc having a radius which is smaller at each progressive level along the axis away from said cylindrical length, and lateral arcs of an ellipse on each side of said circular arc, each said lateral arc merging at an outside thereof with a remainder of the associated surface, whereby the cross-sectional air flow area increases responsive to the degree of opening of the valve member more slowly than would occur in a cylindrical duct, during an initial portion of the opening movement.

2. Butterfly valve assembly according to claim 1, wherein said cylindrical length has a circular cross-section.

3. Butterfly valve assembly according to claim 1, wherein said cylindrical length is symmetrical with respect to said shaft.

4. Butterfly valve assembly according to claim 3, wherein the cylindrical length has an extent along the axis of the duct which is such that, for a constant sonic pressure differential between the upstream and the downstream sides of the valve, a sonic air flow rate, when the upstream edge and the downstream edge of the valve member just pass said cylindrical length, is between 160 and 180% of a sonic air flow rate corresponding to the minimal degree of opening of the valve member.

5. Butterfly valve assembly according to claim 1, wherein said cylindrical length and said butterfly valve member are dissymetrical with respect to said shaft.

6. Butterfly valve assembly for a fuel injection apparatus of an internal combustion engine, comprising:

a body formed with an admission duct having an axis and a cross-section variable along said axis, for circulation of air in a predetermined direction; and a disk shaped butterfly valve member of predetermined shape carried by a shaft that extends transversely to the duct., said valve member being mounted by said shaft for rotation in said body between a minimum opening position of said valve member and a maximum opening position in which said valve member lies substantially parallel to the axis of the duct;

said duct having:

a cylindrical length along the axis whose cross-section perpendicular to the axis matches with the shape of said butterfly valve member when said valve member is in said minimum opening position, said cylindrical length extending upstream and downstream from said minimum opening position along said axis, an upstream zone having a surface merging with said cylindrical length, said surface of the upstream zone having two sides, one side having a rotational symmetry about said axis and the other side having a complex shape, a surface part of said other side following adjacent but with increasing separation a path taken by an edge of said valve member during opening thereof from the minimum opening position up to a predetermined degree of opening, and a downstream zone having a surface merging with said cylindrical length, said surface of the downstream zone having two sides, one side having a rotational symmetry about said axis and the other side having a complex shape, a surface part of said other side following adjacent but with increasing separation a path taken by another edge of said valve member during opening thereof from the minimum opening position up to the predetermined degree of opening, said surface parts of said downstream zone and of said upstream zone which follow a respective one of said edges of said valve member each having, at each progressive level from said cylindrical length along said axis, a cross-section transverse to said axis defined by:

a central circular arc of a circle radially centered about said axis and centered in said surface part, each said circular arc having a radius which is smaller at each progressive level along the axis away from said cylindrical length, and lateral arcs of an ellipse on each side of said circular arc, each said lateral arc merging at an outside thereof with a remainder of the associated surface, each said ellipse forming the associated said lateral arc having an eccentricity such that intersections at progressive levels between the lateral arcs of the associated ellipse and the circular arc lie along a line running from the valve shaft and a projection of the line on an axial plane orthogonal to said axis is substantially rectilinear, whereby the cross-sectional air flow area increases responsive to the degree of opening of the valve member more slowly than would occur in a cylindrical duct, during an initial portion of the opening movement.

7. Butterfly valve assembly according to claim 6, wherein the ellipse at each progressive level along the axis has a short ellipse axis so selected that the associated edges of the valve member remains entirely along the associated surface parts during said initial portion of the opening movement.

* * * * *